United States Patent [19]

Abou-Guendia

[11] 4,035,519
[45] July 12, 1977

[54] PROCESS FOR PREPARATION OF EMULSIFIED WHEAT GLUTEN

[75] Inventor: Maher M. Abou-Guendia, Winnipeg, Canada

[73] Assignee: General Mills Chemicals, Inc., Minneapolis, Minn.

[21] Appl. No.: 580,004

[22] Filed: May 22, 1975

[51] Int. Cl.$^2$ .................... A21D 2/16; A23J 3/00
[52] U.S. Cl. ............................. 426/653; 426/602; 426/656; 426/456; 426/96
[58] Field of Search ........... 426/656, 602, 653, 19, 426/453, 456; 260/112 G

[56] References Cited

U.S. PATENT DOCUMENTS

| | | | |
|---|---|---|---|
| 3,351,531 | 11/1967 | Noznick et al. | 260/112 G UX |
| 3,362,829 | 1/1968 | Landfried et al. | 426/307 |
| 3,463,770 | 8/1969 | Fellers | 426/656 |
| 3,704,131 | 11/1972 | Hampton et al. | 426/453 |

*Primary Examiner*—Raymond N. Jones
*Assistant Examiner*—R. A. Yoncoskie
*Attorney, Agent, or Firm*—Gene O. Enockson; Norman P. Friederichs; Forrest L. Collins

[57] ABSTRACT

Emulsified gluten is prepared by mixing a hydrophilic or lipophilic emulsifier or mixture of such emulsifiers with hydrated wheat gluten.

10 Claims, No Drawings

PROCESS FOR PREPARATION OF EMULSIFIED WHEAT GLUTEN

The present invention relates to gluten products and more particularly to an emulsified gluten.

Vital wheat gluten is widely used today particularly in yeastleavened bakery products such as bread, rolls and buns, as well as, in various other food products such as macaroni, spaghetti and other pasta products. The gluten serves to increase the protein content of these foods Vital gluten also improves dough strength and produces a finer grain and texture in the finished baked bread. Gluten improves the strength of the hinge on hamburger buns. Gluten improves the texture of pasta products while reducing the solids losses during cooking. Generally, commercially available dry gluten contains approximately 70 to 80% protein, dry weight. Gluten protein consists of two fractions, namely, gliadin and glutenin. The remainder of the gluten is starch, lipids, pentosans, fibers and water.

Wheat gluten is prepared by removing a significant portion of the starch, fibers, pentosans and water-soluble materials from wheat flour. This is generally accomplished by water washing. The washed gluten is then dehydrated to form a light tan powder having a bland taste. The wet product may be dried by flash drying, spray drying or freeze drying under known conditions. The gluten, after water washing and before dehydration, is identified herein as "freshly prepared wet gluten."

It is desirable to emulsify the gluten in order to improve its generally poor dispersibility and to improve the handling characteristics of the dry vital gluten during rehydration and preparation of food products. Further, the inclusion of emulsifying agents in bread doughs results in greater processing tolerance, softer bread crumb and resistance to staling of the bread. Emulsifiers such as fatty acid monoglycerides, (i.e., glycerol monostearate) are believed to complex with the amylose fraction of the starch, thus delaying staling by reducing and/or preventing the crystallization of the amylose fraction during the normal bread shelf life. It has been known in the past to prepare an emulsified gluten; however, difficulty has been encountered in preparing such gluten. One known approach for emulsifying gluten is to coat the dry powdered gluten with melted emulsifier. Using such approach, it is difficult to obtain uniformity of distribution of the emulsifier throughout the gluten. Such product has poor wetability. Upon hydration, small lumpy gluten masses are formed which require some vigorous agitation in order to provide proper dispersion. The present invention overcomes such difficulty, provides gluten with a uniform distribution of emulsifier and results in good dispersibility characteristics.

The present invention includes intimately mixing a hydrophilic emulsifier with hydrated gluten. The emulsifier may be a monoglyceride. The monoglyceride may be a fatty acid monoglyceride in which the fatty acid moiety is saturated and has from 16 to 22 carbon atoms. The hydrated gluten may include at least 45%, preferable about 65% water. The moisture content may be about 67%. The terms "percent" and "parts" and the like, as used herein, will mean "by weight" unless otherwise stated. In any event the mixture will include sufficient water to permit intimate penetration of the emulsifier throughout the gluten. The hydrated gluten may be freshly prepared wet gluten or it may be vital gluten that has been dehydrated and subsequently rehydrated. The rehydration may be carried out simultaneously with the addition and intermixing of the emulsifier.

In the past it was not believed possible to emulsify wet gluten without altering its vitality. In the present invention it was unexpectedly discovered that wet gluten can be emulsified providing a high water level is present (i.e., at least 45% by weight).

The hydrophilic and/or lipophilic emulsifier may be one or a mixture of suitable types. The emulsifier typically may be saturated fatty acid monoglycerides (i.e., primarily glycerol mono stearate and small amounts of other mono glycerides) or mixtures of monoglycerides with small amounts of diglycerides and triglycerides (i.e., up to 30 to 40%). Other suitable emulsifiers include succinylated monoglycerides (i.e., particularly of the stearyl type), polyoxyethylene sorbitan monostearate, sodium stearyl-2-lactylate, calcium stearyl-2-lactylate, propylene glycol mono and di esters, polyoxyethylene monostearate, sucrose esters and stearyl monoglyceride citrate. The sucrose esters may include sucrose mono palmitate, sucrose mono stearate, sucrose dilaurate, sucrose dipalmitate, sucrose monostearate, sucrose distearate, sucrose tristearate, sucrose sesquilaurate, sucrose sesquistearate, and sucrose tallwate. Alternatively, the emulsifier may be any suitable food type nonionic hydrophilic emulsifier. Commercially available emulsifiers suitable for use in the present invention include the following: Tandem 9 (product of I.C.I. America, Inc. which is composed of 75% monoglycerides and 25% polysorbate); Myverol SMG (product of Eastmen Chemical Products, Inc., which is composed of succinylated monoglycerides); Polysorbate 60$^{TM}$ (product of I.C.I. America Inc. which is composed of polyoxyethylene sorbitanmonostearate); Emplex (product of Patco Products, Division of C. J. Patterson Company which is composed of sodium stearyl-2-lactylate); as well as, various other available emulsifiers such as polyoxyethylene stearate and stearyl monoglyceride citrate. The emulsifier may be present in an amount of from 10 to 40% by weight based on the dry weight of the combined gluten and emulsifier. The preferred amounts of emulsifier is about 15 to 30%.

The emulsifier is brought to a melted condition prior to mixing with the wet gluten. The temperature of the emulsifier should not be so great as to destroy the vitality of the gluten. In other words it is preferred that the final dried gluten vitality be at least 60% T.N.S: (i.e., totaL nitrogen solubility determined as described in Advances in Protein Chemistry, Volume 2 pp 337ff 1945). Typically the temperature of the emulsifier is between about 40° and 70° C. The temperature of the wet gluten may be at least about 40° C., preferably about 45° to 60° C. during the mixing of the gluten and the emulsifier. The temperature should be high enough that immediate crystallization of the emulsifier does not take place and high enough to facilitate easy mixing. The emulsifier may be added in its natural form or as an emulsion e.g. water-in-oil emulsion of the emulsifier.

The emulsified gluten may be dehydrated by any suitable method such as vacuum drying, flash drying, spray drying or freeze drying under conventional conditions. The gluten may be ground or pulverized such as in any suitable mill. The preferred moisture content of the dehydrated pulverized emulsified gluten is about 5 to 10%. The gluten should be dried to less than about 12% moisture since microbial growth on the gluten may occur above 12% moisture. The moisture content desirably is at least about 15% rancidity may occur if the gluten is dehydrated to less tha 5% moisture.

EXAMPLE I

Emulsified gluten was prepared according to the present invention using freshly prepared mellow wet gluten. The wet gluten contained 66% water and 34% gluten. The wet gluten was maintained at a temperature of 60° C. while the emulsifier (primarily glycerol mono stearate), at 70° C., was added. A laboratory size International Dough Mixer was used to uniformly distribute the emulsifier throughout the gluten. The wet gluten was then vacuum dried to about 7% moisture. The dehydrated gluten was pulverized by treatment in a Stein Laboratory Mill together with dry ice for 3 minutes. Ten grams of the dried product was dispersed in 22 milliliters of distilled water. The dispersibility of this dried product was compared with that of commercially available emulsified gluten and with that of untreated gluten. The present product was found to have the best dispersibility.

EXAMPLE II

Emulsified gluten was prepared according to the present invention substantially as described in Example I except the wet gluten was prepared by mixing sufficient water with dehydrated gluten to provide a moisutre content of 66 percent. Similar results were obtained.

EXAMPLE III

Emulsified gluten was prepared according to the present invention. One hundred grams of powdered gluten was prepared in each of four containers labeled A through D. Two hundred milliliters of water was added to each container at 70° C. To Sample A, 15 grams of monoglyceride at 70° C. was added and mixed in a laboratory size International Dough Mixer for two minutes at low speed. The dispersion was then vacuum dried. Sample B, C, and D were similarly prepared except Sample B included 20 grams of monoglyceride, Sample C included 25 grams of monoglyceride and Sample D included 30 grams of monoglyceride. The dispersibility of Samples A, B, C and D were examined according to the method described in Example I. Although all samples dispersed better than nonemulsified gluten; Samples C and D were superior.

EXAMPLE IV

Example III was repeated except freshly prepared mellow wet gluten was used. Similar results were obtained.

EXAMPLE V

Emulsified gluten was prepared according to the present invention by adding 300 grams of dry gluten to 570 milliliters of water at 60° C. in a Burken's Baker mixer. The water and gluten was mixed uniformly. Then 75 grams of an emulsifier were added at 57.5° C. and mixed for two minutes and vacuum dried. The emulsifier was a commercially available product sold under the trademark Tandem 9 and included 25% polysorbate and 75% fatty acid monoglyceride. The resulting gluten possessed very good dispersibility characteristics.

EXAMPLE VI

Example V was repeated except freshly prepared wet gluten was used and 75 grams of the emulsifier was added to 900 grams of the wet gluten. Similar results were obtained.

EXAMPLE VII

Emulsified gluten was prepared according to the present invention by preparing an emulsifier/water emulsion and then adding the emulsion to freshly prepared wet gluten. The emulsion was prepared by mixing 20 grams of glycerol mono stearate with 15 milliliters of water at 70° C. The resulting emulsion was a water-in-oil emulsion. The emulsion was immediately cooled to 45° C. and mixed with freshly prepared wet gluten which also was at 45° C. The emulsified gluten was vacuum dried.

EXAMPLE VIII

The baking performance of the present emulsified gluten was demonstrated by preparation of expanded sponge dough bread. Sample A was sponge dough bread containing no vital gluten. Sample B was sponge dough bread containing 28 grams of commercial vital gluten without emulsifier. Sample C was sponge dough bread containing 14 grams of commercially available emulsified gluten. Sample D was sponge dough bread containing 14 grams of emulsified gluten prepared as described in Example I. The general formulation for all samples was identical except for the addition of the gluten. The general formulation was as follows:

Table I

| Ingredients | Sponge | Formulation (Content in grams) Dough |
|---|---|---|
| Flour (Blended Flour)* | 455 | 245 |
| Yeast (Red Star) | 21 | — |
| Yeast food (Areo Yeast Food) | 4.2 | — |
| Water | 300 | 185 |
| Cerelose | — | 28 |
| Sucrose | — | 28 |
| Non fat milk solids | — | 7 |
| Salt | — | 14 |
| Lard | — | 17.5 |

*"As is" moisture basis (Flour contained 14% moisture)

The sponge was prepared by placing the ingredients in a jacketed flat bottom Hobart bowl. The Hobart mixer was equipped with a two prong agitator. The sponge was mixed for one minute at the second speed. The sponge was hand rolled and placed in a pan. The sponge was fermented for 4 hours at 82° F. and 90% relative humidity. The sponge for each sample was prepared in an identical manner, except in the case of samples including gluten, the gluten was added to the ingredients prior to mixing. In those instances where gluten was added, an equal amount (i.e., 14 grams) of additional water was also added.

The dough was prepared by placing the water in the jacketed flat bottom Hobart bowl. The dry ingredients were then added and mixed slightly. The fermented sponge then was added and mixed at slow speed for 1 minute. The mixing was continued for about seven minutes as second speed. The resulting dough was placed in the afore-mentioned pan which was greased. The dough was then held for 35 minutes at 82° F. and 90% relative humidity. A portion (i.e., 18.5 ounces) of the dough was covered with a towel for 12 minutes.

The dough was flattened by hand, run through a roller set at thirteen-sixteenth inches and a sheeter set at one-eighth inches. The dough was rolled up and placed in a pan with the dough seams on the bottom. This was held at 109° F. and 90% relative humidity for 60 minutes. The raised dough was then baked at 425° F. for 22 minutes.

Immediately after baking, the loaf volumes were measured by rapeseed displacement method. The internal and external characteristics of the bread were observed and judged according to the standard procedure of the AACC (American Association of Cereal Chemists). The results are reported in the following Table II.

Table II

| Sample | Loaf Volume | Interior Grain | Softness Index |
|---|---|---|---|
| Sample A[1] | 2744 | 5 | 1.00 |
| Sample B[2] | 2888 | 6 | 1.00 |
| Sample C[3] | 2983 | 5.9 | 0.92 |
| Sample D[4] | 2956 | 7.0 | 0.83 |

[1] containing no gluten
[2] containing nonemulsified commercial gluten
[3] containing commercially available emulsified gluten
[4] containing present emulsified gluten The data in the above table demonstrates better performance exhibited by use of the present emulsified gluten. Dough handling characteristics were very good in all samples. Loaf volume with 1% of the present gluten has been found equal to that of the commercially available emulsified gluten used at the same level and has been found to be better than that of commercial nonemulsified gluten at the 2% level. Softness of the sample containing the present gluten was significantly improved over both the commercially available emulsified gluten and the nonemulsified products. The grain of the sample containing the present gluten was superior to all the other samples.

The embodiments of the invention in which an exclusive property or privilege is claimed are defined as follows:

1. A process of preparing emulsified gluten comprising mixing water and gluten to form an aqueous mixture having at least about 45 to 65% water and 55 to 35% gluten, and uniformly dispersing into said aqueous mixture which is at a temperature of from about 45° to about 60° C, about 10 to 40% of melted hydrophilic or lipophilic emulsifier, said emulsifier being at a temperature less than that which will destroy the vitality of the gluten, said temperature being high enough to avoid immediate crystallization while facilitating easy mixing, the amount of said emulsifier being based on the total dry weight of the gluten and emulsifier.

2. The process of claim 1 wherein said emulsifier is glycerol mono stearate.

3. The process of claim 1 wherein said emulsifier is used in an amount of about 15 to 30%.

4. The process of claim 1 wherein said emulsifier is a mixture of monoglycerides, diglycerides and triglycerides of fatty acids.

5. The process of claim 1 wherein said gluten is simultaneously hydrated as said emulsifier is dispersed in said gluten.

6. A process of preparing an emulsified gluten comprising mixing freshly prepared wet gluten at a temperature of about 45° to 60° C and melted hydrophilic or lipophilic emulsifier, said wet gluten having a moisture content of from about 45% to about 60%, by weight, said emulsifier being at a temperature less than that which will destroy the vitality of the gluten, said temperature being high enough to avoid immediate crystallization while facilitating easy mixing, wherein the emulsifier is present at from about 10 to about 40% by weight, and drying said gluten-emulsifier mixture to a moisture content of about 5 to 10% by weight.

7. The process of claim 1 wherein the temperature of said emulsifier is about 40° to 70° C.

8. A process for preparing emulsified glute comprising mixing wet gluten and an emulsifier, said wet gluten having a moisture content of at least about 45% and being present in an amount of from about 60 to 90% by weight, said emulsifier being present at about 40 to 10% by weight, said emulsifier comprising a member of the group consisting of glycerol mono stearate, succinylated monoglyceride, polyoxyethylene sorbitan monostearate, sodium stearyl-2-lactylate, calcium stearyl-2-lactylate, polyoxyethylene stearate, sucrose esters, and stearyl monoglyceride citrate, said wet gluten being at a temperature of between about 40° to 60° C. and said emulsifier being at a temperature of between about 40° to 70° C. when added to the gluten, and drying the gluten-emulsifier mixture to between 5 and 10% by weight.

9. A process for preparing emulsified gluten comprising simultaneously hydrating gluten to a moisture content in the range of about 45 to 65% by weight at a temperature of about 45° to about 60° C and dispersing about 10 to 40% melted hydrophilic emulsifier in said gluten, the amount of said emulsifier being based on the total dry weight of said gluten and emulsifier, said emulsifier being at a temperature less than that which will destroy the vitality of the gluten, said temperature being high enough to avoid immediate crystallization while facilitating easy mixing, and then dehydrating said emulsified gluten to a moisture content of less than about 12% by weight.

10. The process of claim 9 wherein said emulsifier is added to said gluten as a water-in-oil emulsion.

* * * * *